March 18, 1941.  R. L. HENRY ET AL  2,235,429
ELECTRICAL CONNECTION FOR HERMETICALLY SEALED UNITS
Filed June 23, 1939
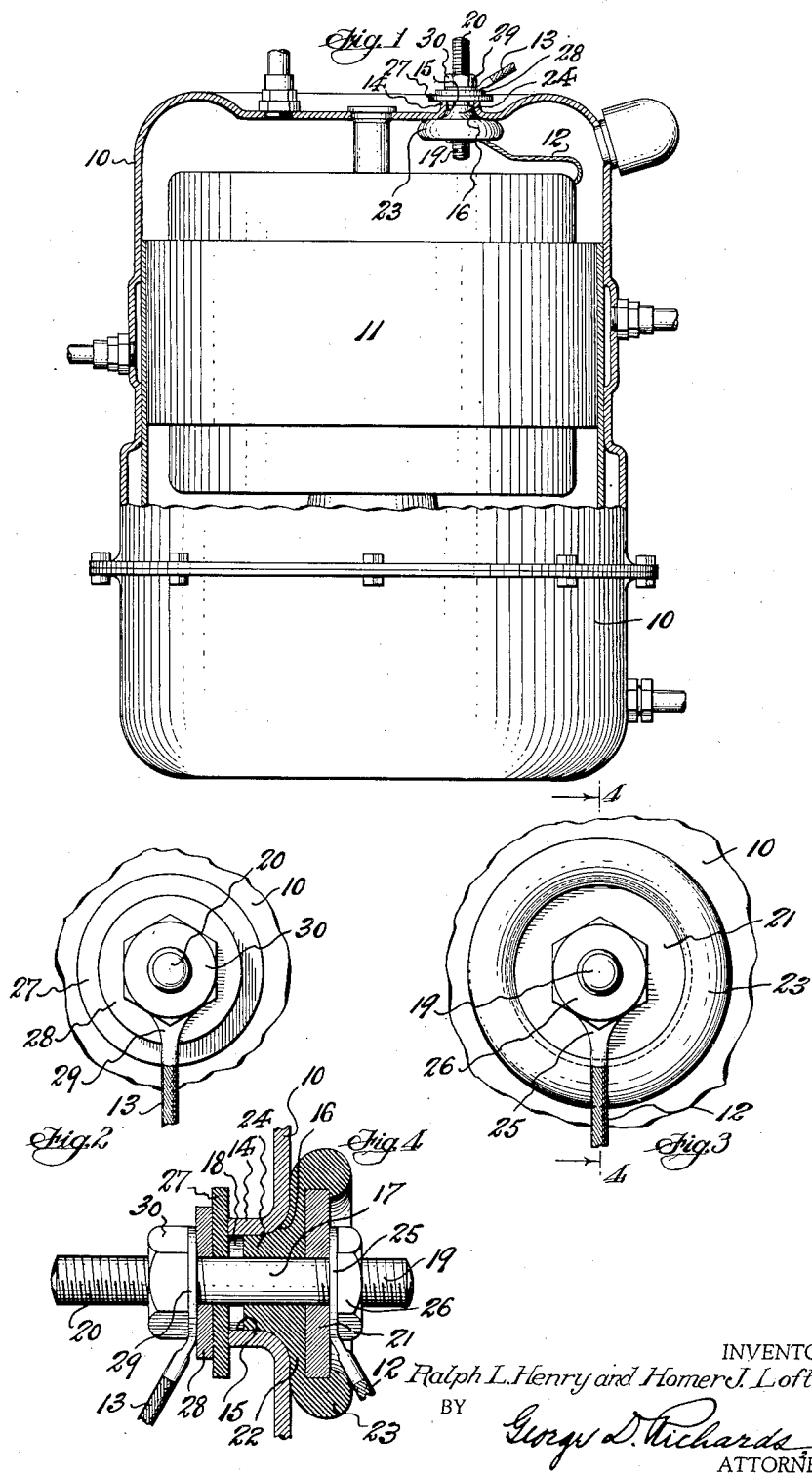
INVENTOR.
Ralph L. Henry and Homer J. Loftis,
BY George D. Richards
ATTORNEY.

Patented Mar. 18, 1941

2,235,429

UNITED STATES PATENT OFFICE 2,235,429

ELECTRICAL CONNECTION FOR HERMETICALLY SEALED UNITS

Ralph L. Henry, Detroit, Mich., and Homer J. Loftis, Ironton, Ohio, assignors to Henrite Products Corporation, Ironton, Ohio, a corporation of Ohio Application June 28, 1939, Serial No. 281,536

2 Claims. (Cl. 174—153)

This invention relates to improvements in electrical connections for hermetically sealed units.

When an electrical device to which operating current is required to be served is enclosed within a hermetically sealed housing, the current service means must pass through the housing wall, and as a consequence there is risk of leakage about the point of such passage which would render the required sealing defective. For example, in refrigerating units of the type comprising an electric motor driven refrigerant compressor sealed within a housing, it is necessary to make electrical connection of an external current source to the motor by conducting means which passes through the housing wall and which is insulated from the latter. In order to prevent escape of the refrigerant fluid, the entering electrical connection must be so arranged, at the point of passage through the housing wall, as to efficiently seal all joints against leakage and escape of the refrigerant gas or other fluid involved.

Having these requirements in mind, the present invention has for an object to provide a novel, simple and yet highly efficient hermetically sealed electrical connection for the purposes stated, and one which is also adapted to adequately insulate the current conductive medium thereof from electrical contact with the housing wall through which it is passed.

The invention has for another object to provide a hermetically sealed electrical connection which not only provides a complete and efficient seal, but which is of such form and construction as to readily withstand relatively unequal external and internal pressures over wide ranges, while at the same time efficiently resisting any tendency to loosening under vibration or like mechanical disturbances.

Other objects of this invention, not at this time more particularly enumerated, will be understood from the following detailed description of the same.

An illustrative embodiment of this invention is shown in the accompanying drawing, in which:

Fig. 1 is in part an elevational view and in part a sectional view of a housing and an electric motor contained therein, with the novel hermetically sealed electrical connection for current supply to the motor shown in elevation and as operatively assembled in connection with the housing wall; Fig. 2 is an enlarged external end view of the hermetically sealed electrical connection; Fig. 3 is an enlarged internal end view of the same; and Fig. 4 is an enlarged vertical longitudinal section through the same.

Similar characters of reference are employed in the above-described views, to indicate corresponding parts.

Referring to the drawing, the reference character 10 indicates a housing within which an electric motor 11 and mechanism (not shown) operated by the latter is enclosed. The internal electrical conducting means 12, for serving the motor with operating current, is connected with the external conducting means 13, leading from a suitable source of electrical energy, through the novel hermetically sealed connection of this invention. Said connection is mounted on and through the wall of said housing 10, said wall having an outwardly pressed boss 14 through which an opening 15 extends, this opening having at its inner end a rounded annular shoulder or seat 16.

The novel hermetically sealed connection according to this invention comprises, an electrically conductive element in the form of a stud 17 of less diameter than the diameter of the housing wall opening 15 so as to provide an intervening annular space 18. Said stud 17 is provided with a screw-threaded inner end portion 19 and a screw-threaded outer end portion 20. Engaged over the inner end of said stud 17 is a metallic backing washer 21. Bonded to said stud 17 and to the backing washer 21 is a resilient sealing body comprising a facing portion 22 contiguous to the inner face of said backing washer, said facing portion 22 terminating at its outer periphery in an enlarged annular marginal bead 23 in which the marginal edge portions of said backing washer 21 are imbedded. Projecting from the facing portion 22 of said sealing body and about the stud 17 is a central plug portion or boss 24 adapted to enter and tightly fit into the housing wall opening 15. The internal conducting means 12 leading to the motor 11 is provided with a perforate terminal member 25 or other suitable means adapted to be engaged over the inner end portion of the stud 17 to abut the outer face of said backing washer 21, the same being firmly held in mechanical and electrical contact therewith by means of a fastening nut 26 which is screwed onto the screw-threaded inner end portion 19 of said stud 17.

After the connecting means 12 is thus attached to the stud 17, the outer end portion of the latter is passed through the housing wall opening 15 to project exteriorly of the housing 10, whereby the sealing body is caused to abut the inner side of the housing wall, with its plug portion or boss 24 extending into the housing wall opening 15. When the stud 17 and sealing body are thus attached to the housing, an insulating washer 27 is engaged over the exterior end portion of the stud 17 to abut the outer extremity of the housing wall boss 14. Said washer 27 may be made of any suitable electrically non-conductive or insulating material. Also engaged over the exterior end portion of the stud 17, to abut and hold said insulating washer 27 against displacement, is a metallic keeper washer 28. The external conducting means 13, leading from a source of electrical energy, is also provided with a perforate terminal member 29 or other suitable means adapted to be engaged over the outer end portion of the stud 17 to abut the outer face of said keeper washer 28, the same being held in mechanical and electrical contact therewith by means of a fastening nut 30 which is screwed onto the screw-threaded outer end portion 20 of said stud 17.

The sealing body 22—23—24 is preferably made of natural or substitute rubber, although it could be made of any other suitable material having the required resilient compressibility. We have found that a substitute rubber compound, such e. g. as that known to industry and trade under the trade-name "Neoprene" is admirably adapted in character for the production of said sealing body. Such material is readily molded to desired shape, and may be, by vulcanization, bonded in strong adhering engagement with the surfaces of the stud 17 and backing washer 21 abutted thereby. Such material is highly resilient; will quickly and intimately conform itself under pressure to the contours of surfaces engaged thereby; and is capable of being compressed and stressed to a very high degree, whereby a most efficient sealing contact with abutted surfaces is assured.

When the hermetically sealed connection is mounted on and through the wall of the housing 10, it is drawn tightly home into sealing relation thereto by tightening the exterior fastening nut 30. When said nut 30 is tightened, the central plug portion or boss 24 is firmly and tightly wedged into the space 18 intermediate the stud 17 and the sides of the housing wall opening 15, while at the same time the facing portion 22 is forced tightly against the inner face of the wall of the housing, and into conforming close fitting engagement with the annular shoulder or seat 16 at the inner end of the housing wall opening, thus effecting a close sealing union with the housing over a substantial surface area. Owing to the fact that the seating body is bonded to the stud 17 and to the backing washer 21, considerable compression, shearing and tensile stresses are built up in the body in all dimensions, thus assuring the integrity of the seal, and its maintenance uninterrupted by reason of vibration, shocks or other mechanical disturbances. The bonded attachment of the sealing body to the stud 17 and washer 21 also prevents any tendency of the same to be squeezing out of place or opening up gaps at any point.

The novel hermetically sealed connection is capable of withstanding relatively unequal pressures externally and internally of the housing.

While the illustrated example of the sealing body is shown disposed in operative engagement with the interior of the wall of the housing 10, it will be obvious that this is optional, since it could equally well be arranged to engage the exterior of said wall.

We are aware that many changes could be made in the hermetically sealed connection above described and as shown in the accompanying drawing, and that many apparently widely different embodiments of this invention could be made without departing from the scope thereof as defined in the following claims. It is therefore intended that all matter contained in the above description or shown in the accompanying drawing shall be interpreted as illustrative and not in a limiting sense.

We claim:

1. In combination, a housing having an electrical device sealed within the same, said housing having a tubular boss providing an opening through the housing wall, the juncture of said boss with the housing wall being formed to provide a rounded seating shoulder, a hermetically sealed connection comprising a conductive stud extending through said opening to the respective end portions of which electrical conductors to serve said electrical device are attachable, an electrically conductive backing washer affixed to one end portion of said stud, a resilient electrically non-conductive sealing body bonded to said stud and washer, said sealing body comprising an annular plug portion around said stud to enter the boss opening and an integral facing portion contiguous to the inner face of said backing washer terminating in an annular peripheral bead in which the marginal portion of said backing washer is imbedded, an insulating member carried by the opposite end portion of said stud to abut the free end of said boss, and means operative upon said opposite end portion of said stud manipulatable to move said stud axially whereby said sealing body is drawn into conforming and tightly compressed sealing relation to the housing wall and said seating shoulder with its plug portion compressively entered in said opening.

2. The combination as defined in claim 1, wherein the means for axially moving the stud comprises the provision of screwthreads on an end portion thereof and a nut threaded thereon to bear either directly or indirectly upon the insulating member which abuts the boss end thereby to purchase said nut when turned to impart desired axial movement to the stud.

RALPH L. HENRY.
HOMER J. LOFTIS.